United States Patent
Horng

Patent Number: 6,070,494
Date of Patent: Jun. 6, 2000

[54] STRAIGHT AXLE TYPE ROTATING AXLE STRUCTURE

[76] Inventor: Chin Fu Horng, No. 9, Alley 90, Fu Hsin Rd., Lo Chou City, Taipei Hsien, Taiwan

[21] Appl. No.: 09/157,110

[22] Filed: Sep. 18, 1998

[51] Int. Cl.⁷ .............................. F16H 57/07; E05C 17/64
[52] U.S. Cl. ................................ 74/607; 16/342; 16/340; 16/337; 16/338
[58] Field of Search ............................ 74/607, 609, 608; 16/342, 337, 340, 338; 4/236, 248

[56] References Cited

U.S. PATENT DOCUMENTS

| | | | |
|---|---|---|---|
| 4,408,799 | 10/1983 | Bowman | 16/342 X |
| 5,022,778 | 6/1991 | Lu | 16/342 X |
| 5,826,307 | 10/1998 | Chin-Fu | 16/340 |
| 5,906,010 | 5/1999 | Suzuki | 16/342 |
| 5,937,482 | 8/1999 | Horng | 16/337 |
| 5,940,936 | 8/1999 | Lu | 16/337 |

*Primary Examiner*—David A. Bucci
*Assistant Examiner*—Marcus Charles
*Attorney, Agent, or Firm*—Rosenberg, Klein & Lee

[57] ABSTRACT

A straight axle type rotating axle structure comprises a housing, a sleeve, and a spindle. The inner part of the housing is formed as a container, one end of which is formed with an opening. A slot is installed on the inner wall of the opening. A plurality of spaced trenches are installed on the opening, and a joint end is formed on one end of the housing. The sleeve is fixed within the container in the housing. The two ends of the spindle are formed with an axle portion and a joint end, respectively. The convex ring is circularly installed between the axle portion and a joint end. A twisting force is provided by the friction force between the axle portion and the sleeve, and the convex ring is fitting into the slot of the housing. By above structure, a rotating axle structure is formed, by which a twisting force is provided by a coaxial manner. It has a simple structure and is easy to be assembled. Therefore, the manufacturing cost is reduced greatly.

3 Claims, 5 Drawing Sheets

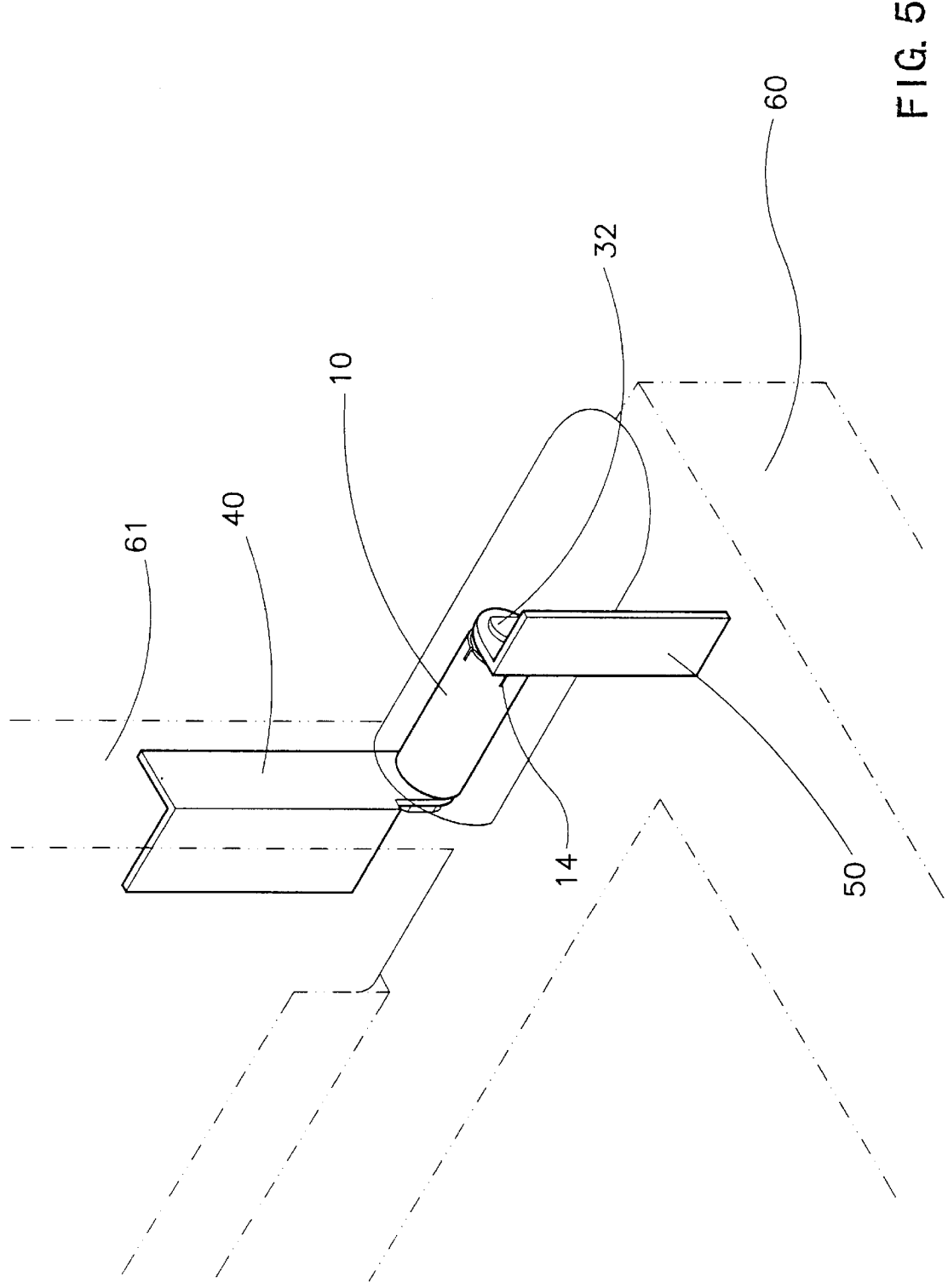

STRAIGHT AXLE TYPE ROTATING AXLE STRUCTURE

BACKGROUND OF THE INVENTION

The present invention relates to a straight axle type rotting axle structure, particularly to a rotating axle structure may be applied on a notebook computer and other devices.

A rotating axle structure is installed to connect the main frame and the liquid crystal display of a notebook computer, by which the main frame and the liquid crystal display are pivotally connected, so that the notebook can be opened or closed.

As shown in FIG. 1, a prior art rotating axle structure has two positioning pieces 11a for fixing on the main frame 12a and the liquid crystal display 13a. One side of the positioning piece 10a is extended with a spindle 14a. One end of the spindle 14a is connected with a pad 15a by rivets. A plurality of pads 16a, 17a, and 18a are installed on the spindles 14a on the two sides of the positioning pieces 11a for providing a proper twisting force by the friction between the pads 16a, 17a and 18a and the positioning pieces 11a.

However, in above prior art rotating axle structure, the twisting force provided by the friction between the pads 16a, 17a and 18a and the positioning pieces 11a is formed by clamping, thus a plurality of pads are necessary. The structure thereof is relative complicate and is not easy to be assembled. Therefore, the manufacturing cost is high.

SUMMARY OF THE INVENTION

Accordingly, the object of the present invention is to provide a straight axle type rotating axle structure comprises a housing, a sleeve, and a spindle. The sleeve is fixed within the housing and the spindle is fitted within the sleeve by an axle portion. A proper twisting force is provided by the friction force between the axle portion and the sleeve. In the present invention, a twisting force is provided by the friction force between the outer wall of the axle portion of the spindle and the inner wall of the sleeve. It is unnecessary to install a plurality of pads and thus the present invention has a simple structure and is easy to be assembled. Therefore, the manufacturing cost is reduced greatly.

The present invention will be better understood and its numerous objects and advantages will become apparent to those skilled in the art by referencing to the following drawings in which:

BRIEF DESCRIPTION OF THE DRAWINGS

FIG. 5 is a schematic view of the present invention applied in a notebook computer.

DETAILED DESCRIPTION OF THE PREFERRED EMBODIMENT

Figure 1:
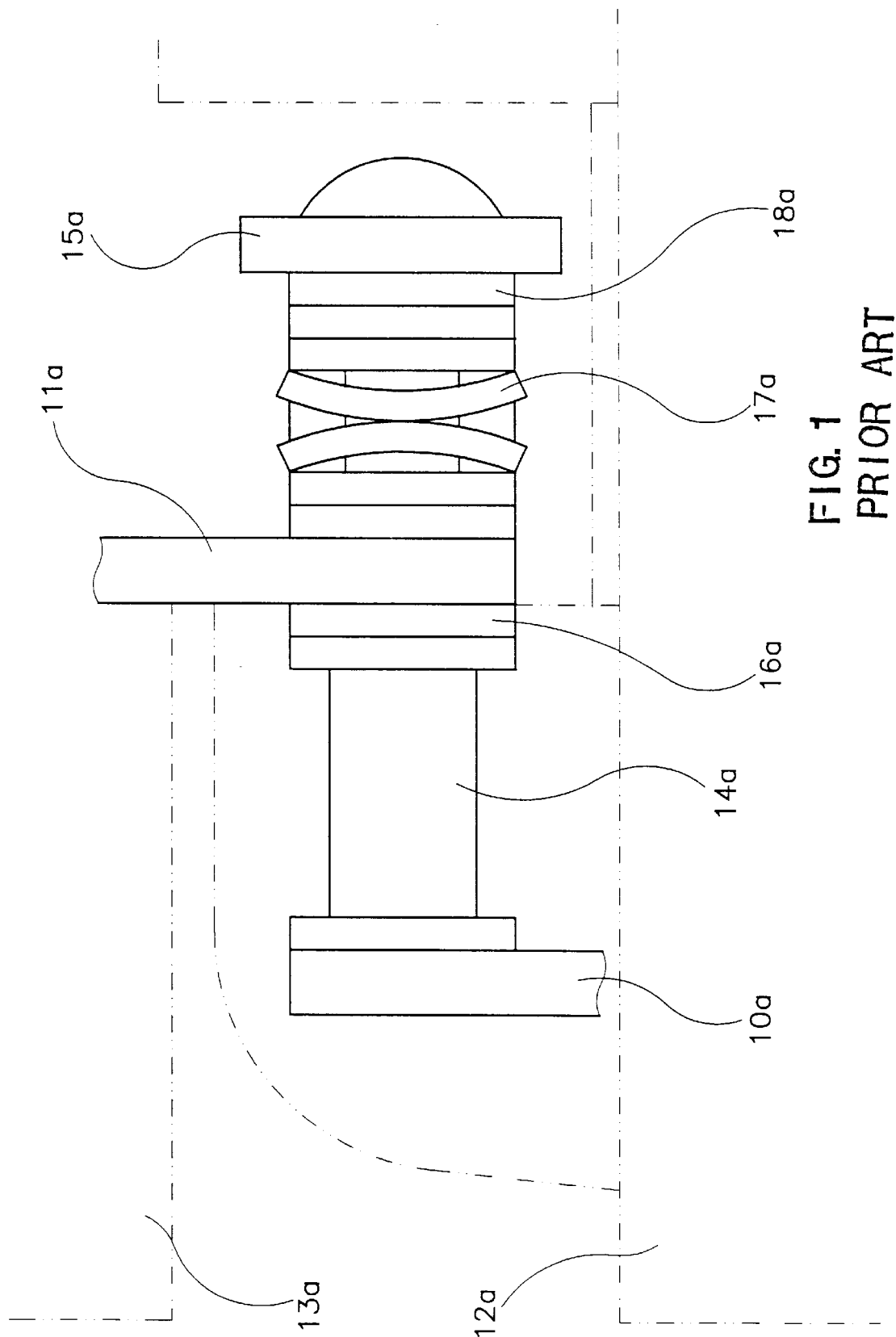
FIG. 1 is a plan view of a prior art axle portion.
Figure 2:
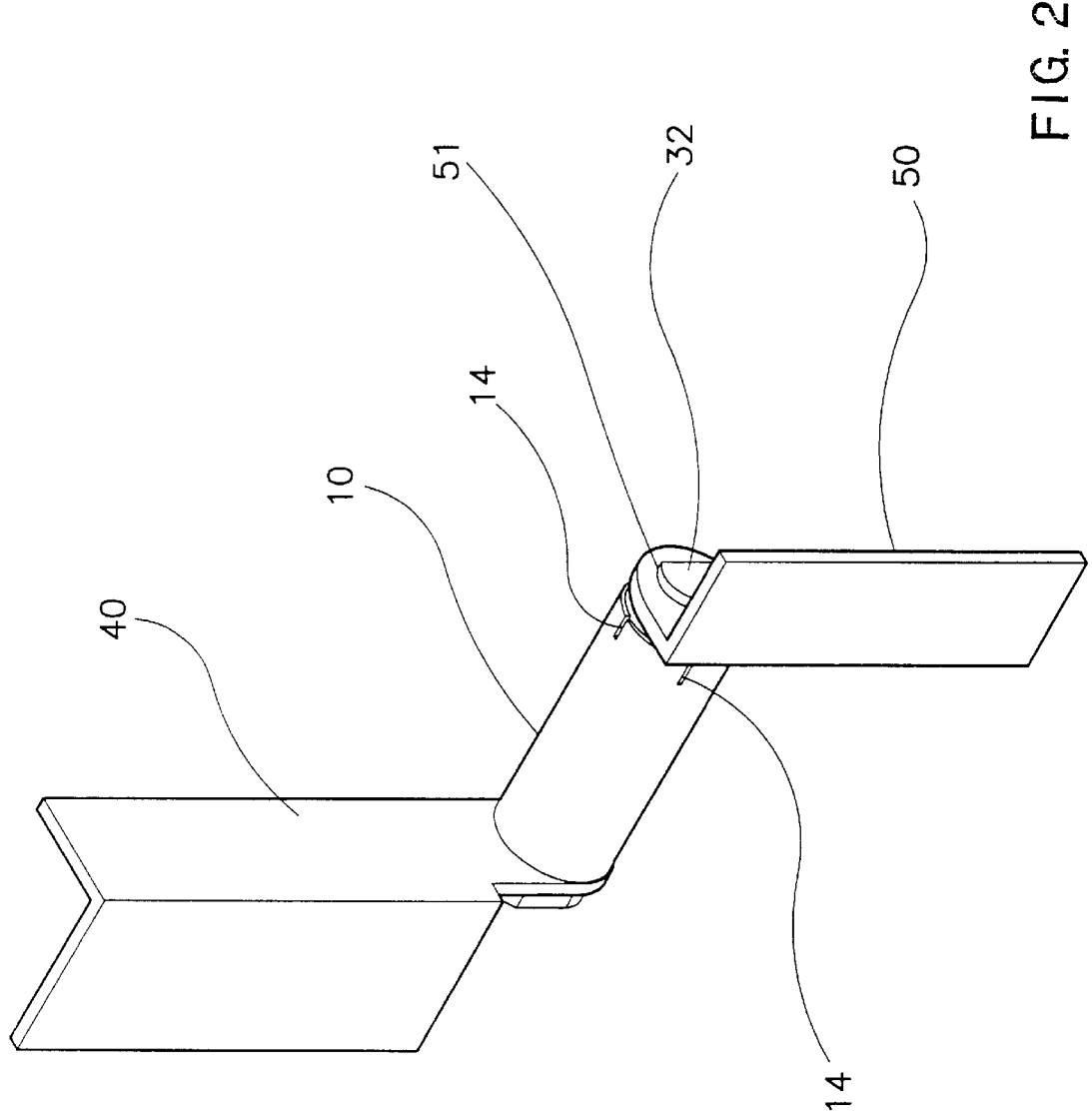
FIG. 2 is a perspective view of the present invention.
Figure 3:
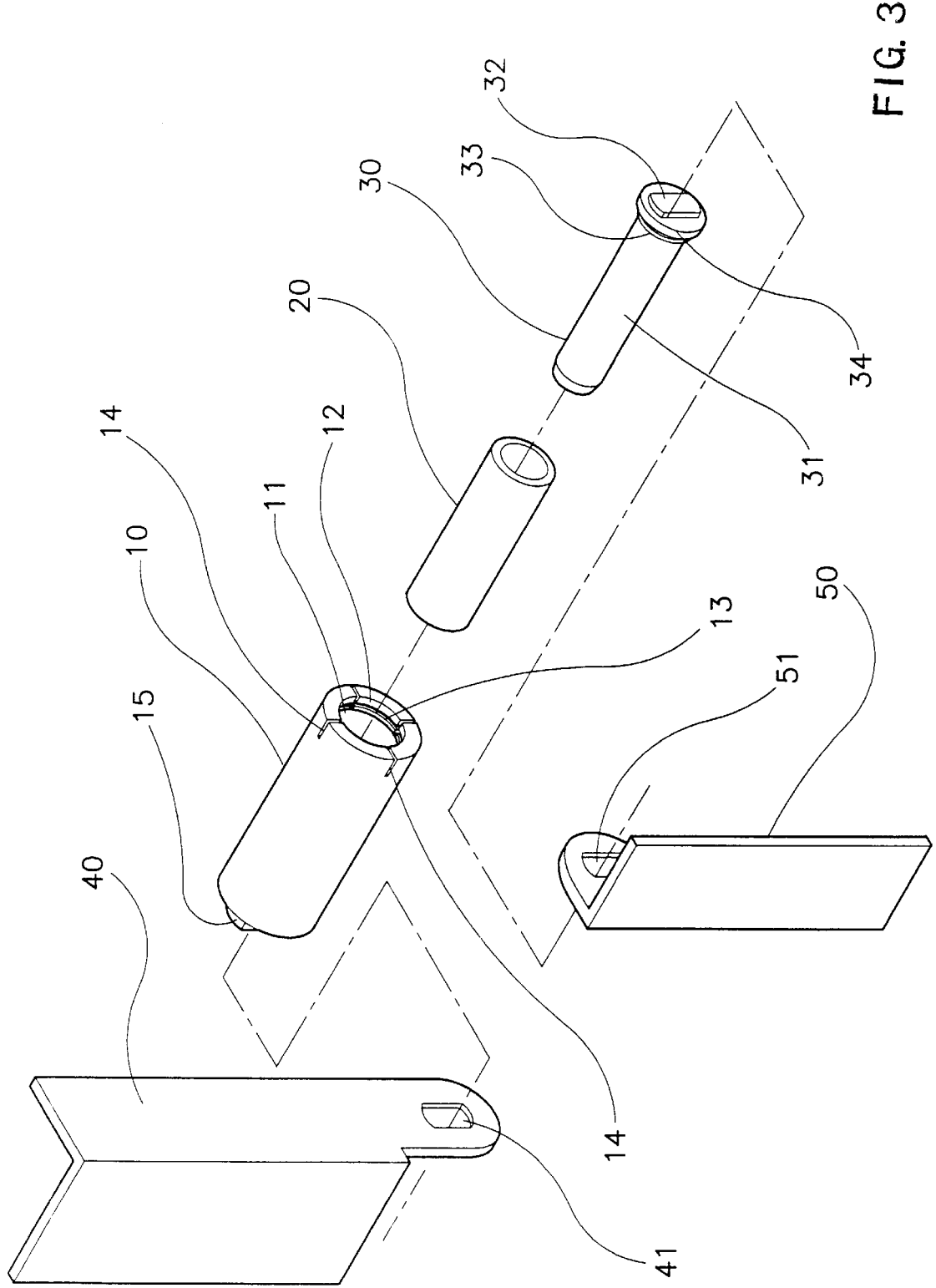
FIG. 3 is an exploded view of the present invention.
Figure 4:
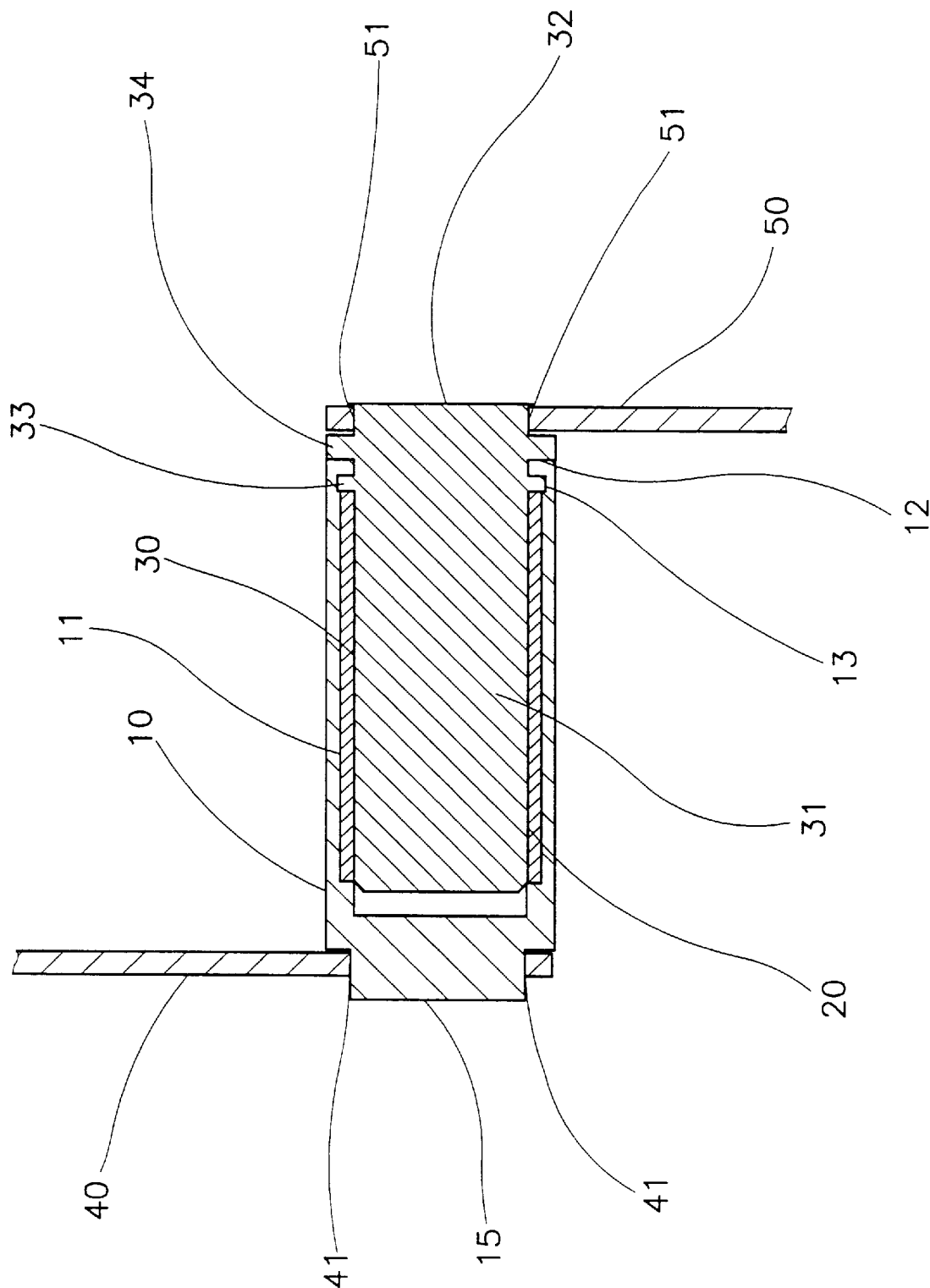
FIG. 4 is a cross sectional view of the present invention.

Referring to FIGS. 2, 3 and 4, the straight axle type rotating axle structure of the present invention comprises a housing 10, a sleeve 20, and a spindle 30. The housing 10 is made by a metal material and is formed with a cylindrical internal chamber. The interior of the housing 10 is formed with an internal chamber 11 one end of which is formed as an opening 12. A slot 13 is circularly installed on the inner wall of the opening 12 of the chamber 11. A plurality of slits 14 are formed equally spaced at the opening 12 of the chamber 11 so that the inner radius of the opening 12 of the chamber 11 may be varied flexibly, thus the spindle can be assembled easily. A projecting joint end 15 is formed on one end of the housing 10 with respect to the opening 12. The joint end 15 may be fixed on the joint hole 41 in the positioning piece 40 by rivets. Therefore, the sleeve 10 can be combined together with the positioning piece 40.

The sleeve 20 is made by the mixing material of Nylon, glass fiber, and Teflon and is a hollow cylinder. The sleeve 20 is tightly fitted into the chamber 11 in the housing 10.

The spindle 30 is made by a metal material, one end of which is formed as an axle portion 31, and another end of which is formed as a joint end 32. A convex ring 33 is circularly installed between the axle portion 31 and the joint end 32 and a flange 34 is circularly installed between the convex ring 33 and the joint end 32. The joint end 32 can be fixed on the joint hole 51 of another positioning piece 40 by rivets so that the spindle 30 can be combined together with the positioning piece 50. The axle portion 31 of the spindle 30 can be fitted into the interior of the sleeve 20 within the chamber 11 of the housing 10. A proper tightness is sustained between the axle portion 31 and the sleeve 20 for providing a proper twisting force by a friction force. When the convex ring 33 is forced into the slot 13 and fitted with the housing 10, the spindle 30 and the housing 10 will be combined as an integral body and will not release. The flange 34 of the spindle 30 may resist against the opening 12 of the housing 10. By the aforementioned structure, a rotating axle structure is formed.

As shown in FIG. 5, the rotating axle structure of the present invention can be connected with the main frame 60, liquid crystal display 61, and other components, wherein two positioning piece 50 and 40 are fixed on the main frame 60 and the liquid crystal display 61, respectively. Thus, the main frame 60 and the liquid crystal display 61 are pivotally connected as an integral body by the rotating axle structure. The liquid crystal display 61 may be opened or closed with respect to the main frame 60 by using the rotating axle structure as a fulcrum.

The sleeve 20 within the present invention is made by a mixing material of Nylon, glass fiber, and Teflon. Thus it has a preferred rubbing endurance. Since the sleeve 20 contains glass fiber and Teflon the characteristics of which are similar to that of metals, thus the rubbing endurance thereof is near that of metals. Another, the property of cold contraction and hot expansion in Nylon is included therein. Accordingly, the tightness is more preferable than metals. Moreover, the plastic material is elastic, thus the tight twisting force thereof may be adjusted according to the requirement of customs. Further, the rubbing endurance of the present invention is controlled by the sleeve 20 therewithin, therefore, any additional lubricating oil is not needed. In consequence, the defect in the prior art that the oil probably pollutes the notebook is prevented.

In the present invention, a twisting force is provided by the friction force between the outer wall of the axle portion 31 of the spindle 30 and the inner wall of the sleeve 20. Lubricating oil is unnecessary and oil pollution is prevented. The twisting force may be above 2 Kg and the lifetime thereof may be above 32000 times. The twisting force between the sleeve 20 and the spindle 30 is provided in a coaxial manner. It is unnecessary to install a plurality of pads and thus the present invention has a simple structure and is easy to be assembled. Therefore, the manufacturing cost is reduced greatly.

Although the present invention has been described using specified embodiment, the examples are meant to be illustrative and not restrictive. It is clear that many other variations would be possible without departing from the basic approach, demonstrated in the present invention.

What is claimed is:

1. A pivotally adjustable coupling assembly comprising:
   (a) an elongate housing member having a joint end portion and an open end portion, said housing member having formed therein an internal chamber extending axially inward from said open end portion, said open end portion having formed therein a plurality of axially extending slits spaced one from the other and an internal annular slot;
   (b) a sleeve member securely received in said bore, said sleeve member having an internal wall portion defining an axially extended bore; and
   (c) a spindle member coupled to said sleeve member in angularly adjustable manner, said spindle member having a joint engagement portion and an axle portion extending therefrom, said axle portion being coaxially received in said bore of said sleeve member to frictionally engage said internal wall portion thereof, said spindle member having a convex ring portion disposed between said joint engagement portion and said axle portion, said convex ring portion lockingly engaging said internal annular slot of said housing member.

2. The coupling assembly as recited in claim 1 further comprising a pair of positioning pieces respectively coupled to said housing member joint end portion and said spindle member joint engagement portion.

3. The coupling assembly as recited in claim 1 wherein said joint engagement portion of said spindle includes an annular flange projecting radially therefrom to engage said open end portion of said housing member.

* * * * *